United States Patent [19]

Yasuda et al.

[11] Patent Number: 5,040,213
[45] Date of Patent: Aug. 13, 1991

[54] METHOD OF RENEWING REFERENCE PATTERN STORED IN DICTIONARY

[75] Inventors: Seigou Yasuda, Yokosuka; Kazuhiko Nishimura, Kawasaki, both of Japan

[73] Assignee: Ricoh Company, Ltd., Japan

[21] Appl. No.: 468,173

[22] Filed: Jan. 22, 1990

[30] Foreign Application Priority Data

Jan. 27, 1989 [JP] Japan .................................. 1-18523
Mar. 3, 1989 [JP] Japan .................................. 1-52438
May 2, 1989 [JP] Japan .................................. 1-113401

[51] Int. Cl.$^5$ .............................................. G10L 5/00
[52] U.S. Cl. ........................................ 381/43; 381/41
[58] Field of Search ................................... 381/41–43

[56] References Cited

U.S. PATENT DOCUMENTS 4,905,287 2/1990 Segawa ................................ 381/43

FOREIGN PATENT DOCUMENTS 0191354 8/1986 European Pat. Off. .
3129282 2/1983 Fed. Rep. of Germany .
3129353 2/1983 Fed. Rep. of Germany .
3216800 3/1988 Fed. Rep. of Germany .

OTHER PUBLICATIONS

Copy of brochure entitled "Voice Master Key a Voice Recognition System," *Voice Master & Speech Thing,* Covox, Inc.

*Primary Examiner*—Emanuel S. Kemeny
*Attorney, Agent, or Firm*—Mason, Fenwick & Lawrence

[57] ABSTRACT

A reference pattern renewing method includes inputting an input pattern of an utterance of a word, comparing the input pattern with reference patterns stored in a dictionary memory to thereby generate at least a first candidate having the highest degree of similarity and a second candidate having the second highest degree of similarity, and calculating a ratio of the highest degree of similarity to the second highest degree of similarity. The method further includes determining whether or not the ratio is equal to or less than a predetermined threshold value, calculating, from the input pattern, a renewed reference pattern to be substituted for a corresponding one of the reference patterns when it is determined that the ratio of the highest degree of similarity to the second highest degree of similarity is neither equal to nor less than the predetermined threshold value, and registering the renewed reference pattern in the dictionary memory instead of the corresponding one of the reference patterns.

13 Claims, 15 Drawing Sheets

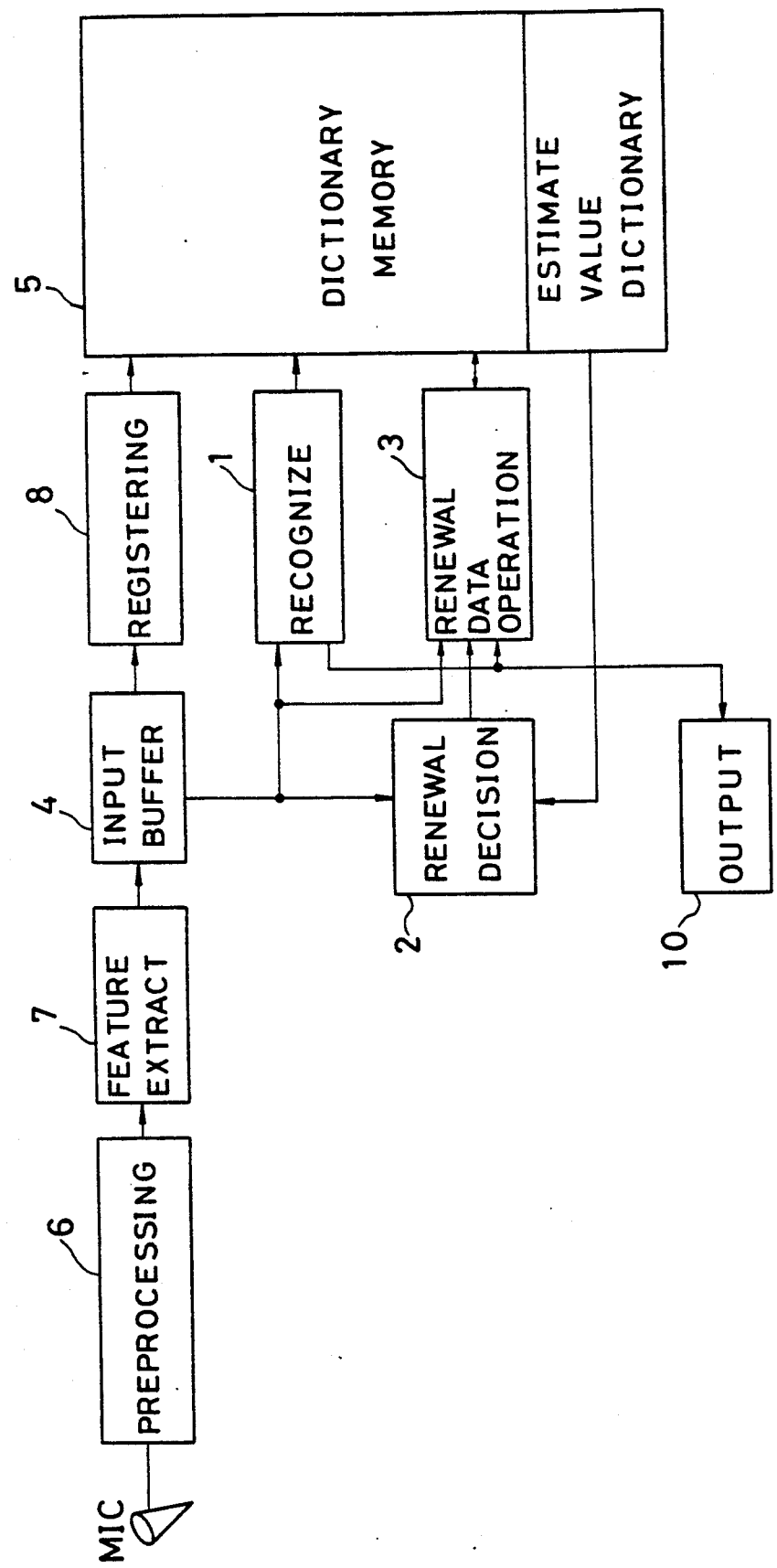

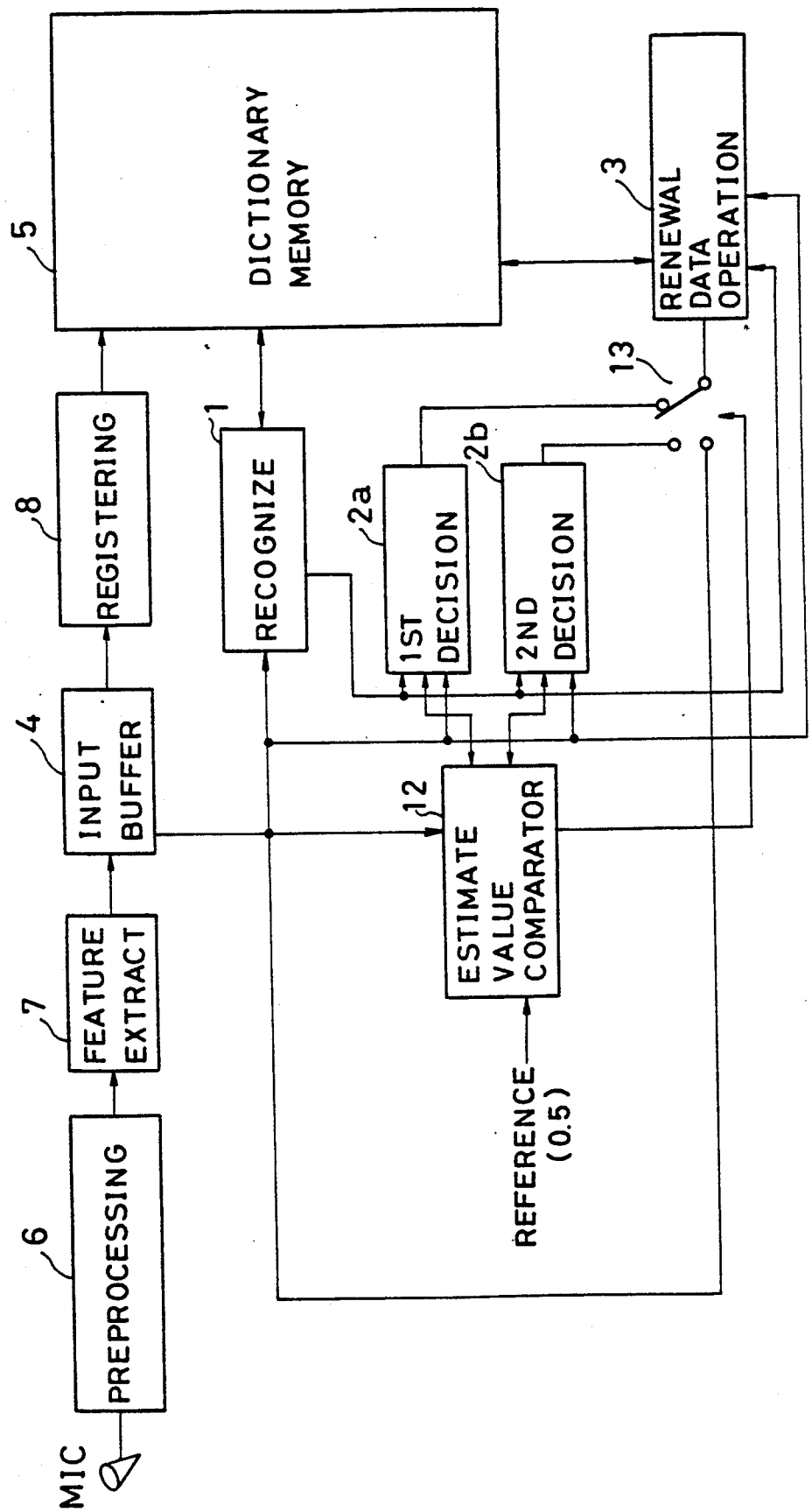

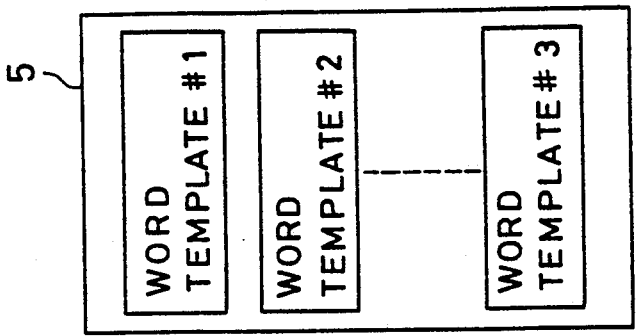
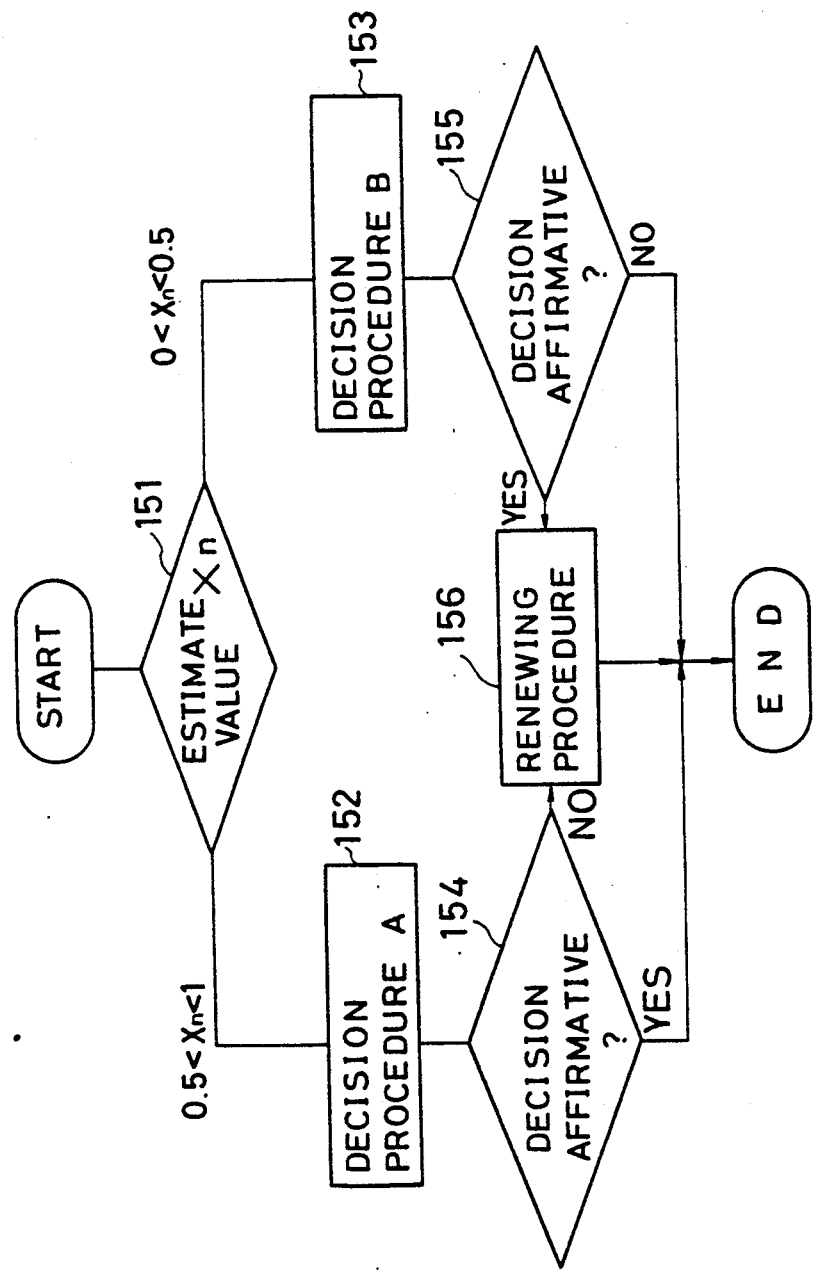

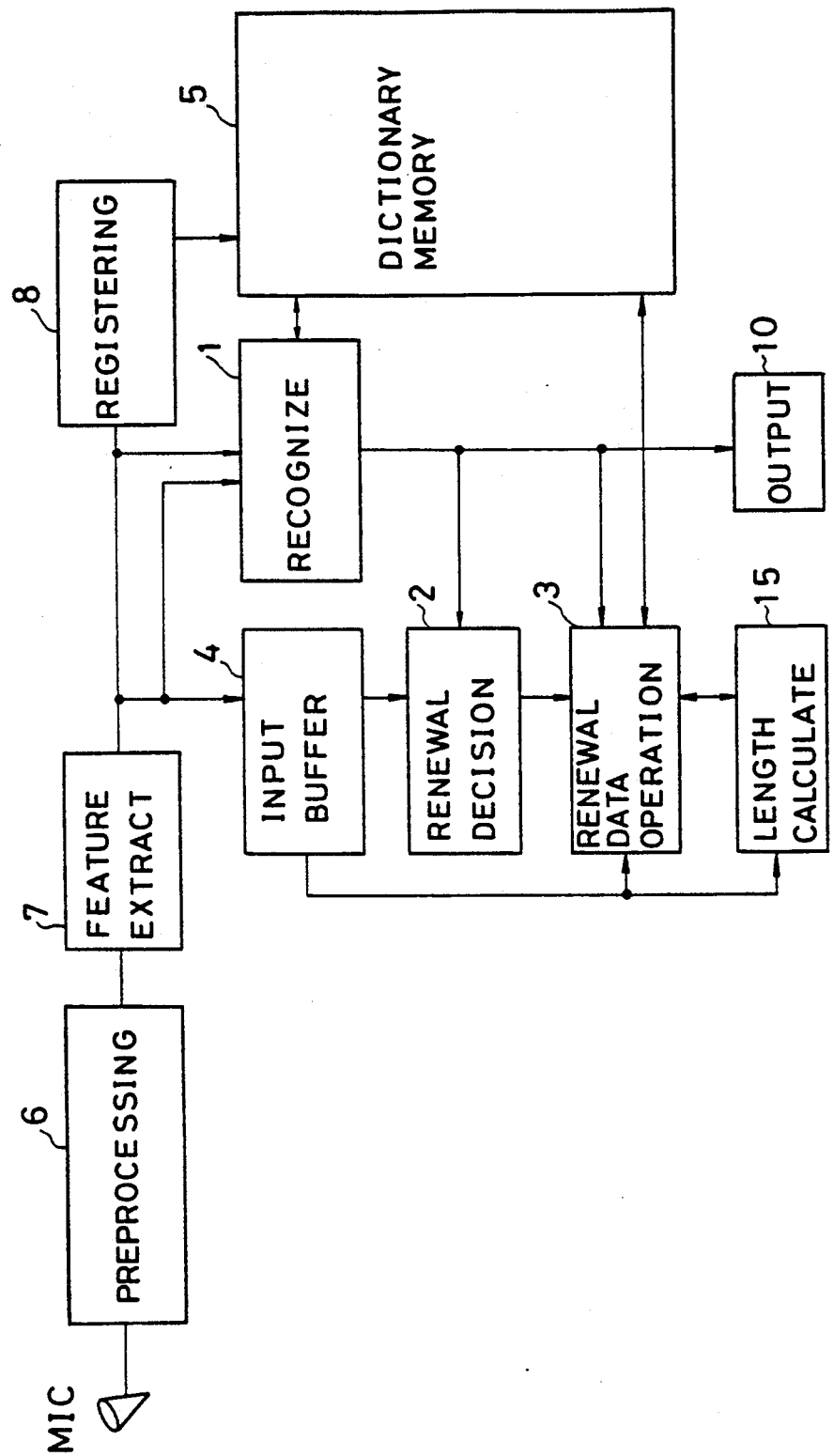

(a) TEMPLATE  SE  TEE  BU
(b) 1ST INPUT  SE  TEE  BU
(c) 2ND INPUT  SE  TEE  BU
(d) 3RD INPUT  SE  TEE  BU
(e) PROVISIONAL PATTERN  SE  TEE ▨ BU  ← SILENT SECTION
(f) FINAL RED REF. PATTERN  SE  TEE  BU

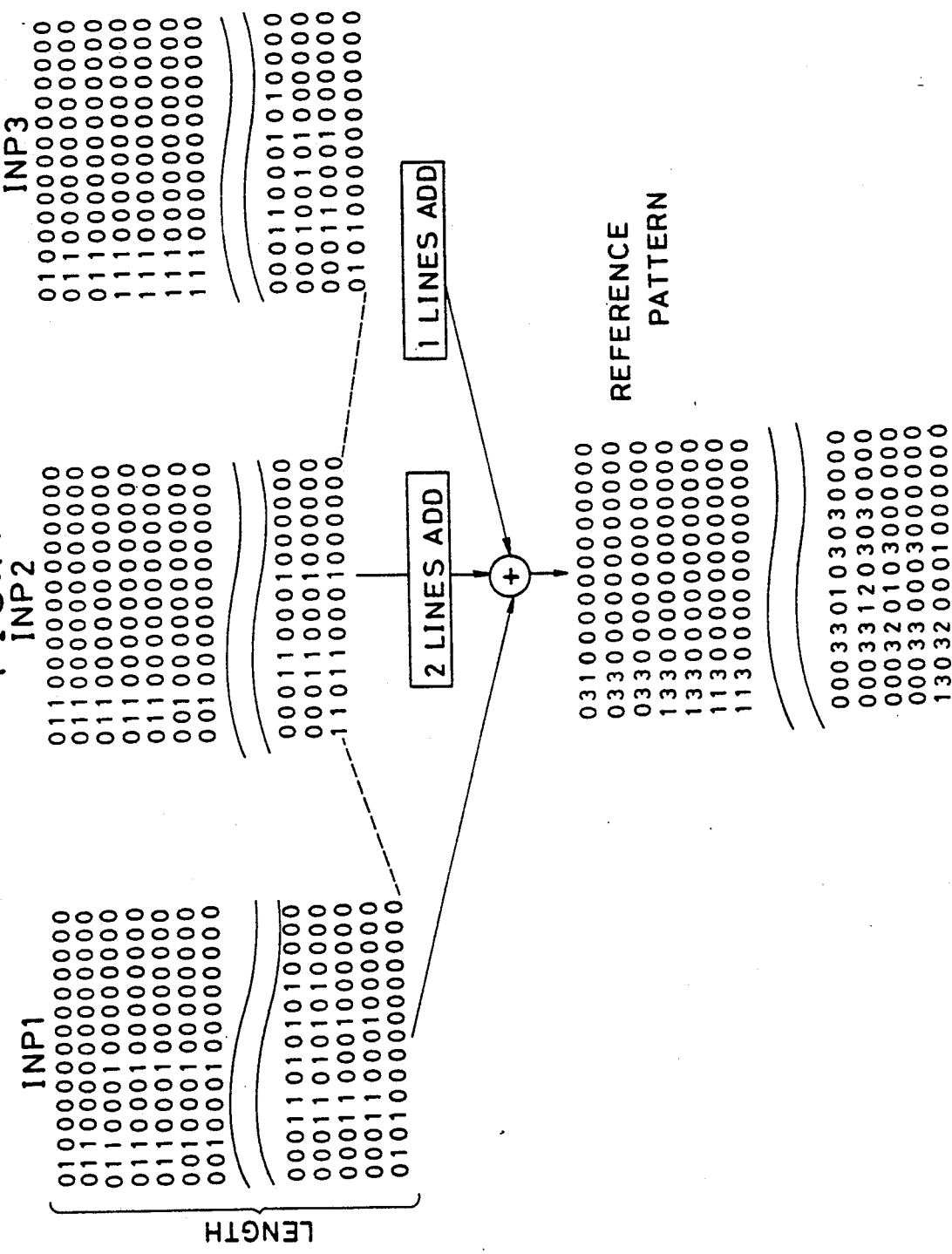

METHOD OF RENEWING REFERENCE PATTERN STORED IN DICTIONARY

BACKGROUND OF THE INVENTION

The present invention generally relates to a speech recognition, and more particularly to a method of renewing a reference pattern stored in a dictionary.

Recently, there has been considerable activity in the research and development of a speech recognition system. A dictionary which stores reference patterns used for identifying an unknown input speech is provided in a speech recognition system. Reference patterns are created beforehand and registered in the dictionary. It is frequently required to renew the reference patterns registered in the dictionary. Conventionally, various methods of renewing a reference pattern have been proposed. For example, the user creates and registers a modified reference pattern instead of the corresponding old reference pattern.

Alternatively, an unknown input pattern is recognized by using a modified reference pattern prepared by the user before it is registered in the dictionary. When the user decides that a candidate having the highest degree of similarity is correct, the old reference pattern is renewed by the modified reference pattern. This process is complicated because the renewing process needs the user's decision. Further, when a modified reference pattern that is decided to be substituted for the old reference pattern is created under a noisy condition which the user is not aware of, the quality of the dictionary is degraded

SUMMARY OF THE INVENTION

It is a general object of the present invention to provide an automatic reference pattern renewing method in which the above-mentioned disadvantages are got rid of.

A more specific object of the present invention is to provide an automatic reference pattern renewing method which allows to accurately and effectively renew reference patterns registered in a dictionary.

The above-mentioned objects of the present invention are achieved by a reference pattern renewing method comprising (a) inputting an input pattern of an utterance of a word; (b) comparing the input pattern with reference patterns stored in a dictionary memory to thereby generate at least a first candidate having the highest degree of similarity and a second candidate having the second highest degree of similarity; (c) calculating a ratio of the highest degree of similarity to the second highest degree of similarity; (d) determining whether or not the ratio is equal to or less than a predetermined threshold value; (e) calculating, from the input pattern, a renewed reference pattern to be substituted for a corresponding one of the reference patterns when it is determined that the ratio of the highest degree of similarity to the second highest degree of similarity is neither equal to nor less than the predetermined threshold value; and (f) registering the renewed reference pattern in the dictionary memory instead of the corresponding one of the reference patterns.

The aforementioned objects of the present invention are also achieved by a reference pattern renewing method comprising (a) inputting an input pattern of an utterance of a word; (b) comparing the input pattern with reference patterns stored in a dictionary memory to thereby generate at least a first candidate having the highest degree of similarity and a second candidate having the second highest degree of similarity; (c) calculating a ratio of the highest degree of similarity to the second highest degree of similarity; (d) determining whether or not the ratio is equal to or less than a predetermined threshold value; (e) making a predetermined additional decision on whether or not one of the reference patterns relating to the highest degree of similarity is to be renewed when the step (d) determines that the ratio is equal to or less than the predetermined threshold ratio; (f) calculating, from the input pattern, a renewed reference pattern to be substituted for the one of the reference patterns when the step (f) determines that the one of reference patterns should be renewed; and (g) registering the renewal reference pattern in the dictionary memory instead of the one of the reference patterns.

Additional objects, features and advantages of the present invention will become apparent from the following detailed description when read in conjunction with the accompanying drawings.

BRIEF DESCRIPTION OF THE DRAWINGS

FIG. 5 is a block diagram of a speech recognition system having a renewal mechanism according to a second preferred embodiment of the present invention;

FIG. 6 is a block diagram of a speech recognition system having a renewal mechanism of a variation of the second embodiment of the present invention shown in FIG. 5;

FIG. 7 is a flowchart of a renewal decision procedure which is executed by the renewal decision circuit shown in FIG. 6;

FIG. 8 is a block diagram of a third embodiment of the present invention;

FIG. 9 is a diagram illustrating the contents of a dictionary memory shown in FIG. 8;

FIG. 11 is a diagram illustrating how to create a word template (reference pattern) to be registered in the dictionary memory shown in FIG. 8;

DESCRIPTION OF THE PREFERRED EMBODIMENTS

Figure 1:
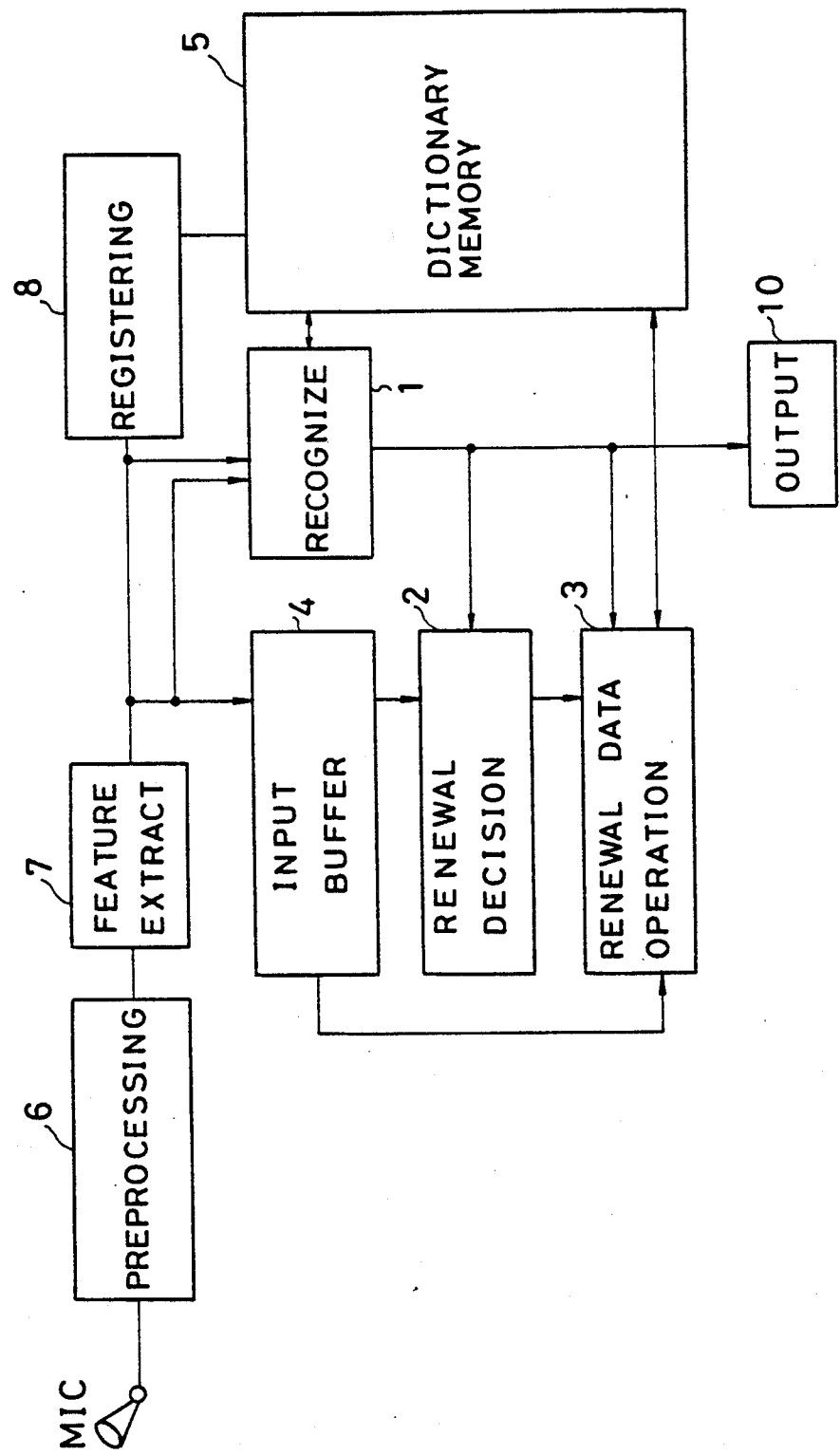
FIG. 1 is a block diagram of a speech recognition system having a renewal mechanism according to a first preferred embodiment of the present invention.

Referring to FIG. 1, an input unknown pattern of an utterance of a word is input from a microphone MIC to a preprocessing circuit 6, which amplifies and corrects the input unknown pattern. An output signal from the preprocessing circuit 6 is input to a feature extracting circuit 7, which extracts features necessary for speech recognition, such as power spectra or LPC cepstra from the output signal supplied from the preprocessing circuit 7. The extracted features are supplied to a recognition circuit 1, an input buffer 4 and a registering circuit 8. When it is not requested to perform the renewing procedure according to the present invention, a reference pattern formed from the extracted features are simply registered in a dictionary memory 5 through the registering circuit 8.

The input buffer 4 temporarily stores the extracted features from the feature extracting circuit 7, and supplies the same to a renewal decision circuit 2 and a renewal data operation circuit 3. The renewal decision circuit 2 executes renewal decision procedures shown in FIGS. 2, 3 and 4A through 4C. The renewal data operation circuit 3 generates data representing a renewed reference pattern stored in the dictionary memory 5 from the input pattern (extracted features) supplied from the input buffer 4.

The recognition circuit 1 compares the input pattern (an input feature) from the feature extracting circuit 7 with the reference patterns (reference features) stored in the dictionary memory 5, and outputs a plurality of candidates having individual degrees of similarity. The candidates are supplied to the renewal decision circuit 2 and a user through an output circuit 10.

Figure 2:
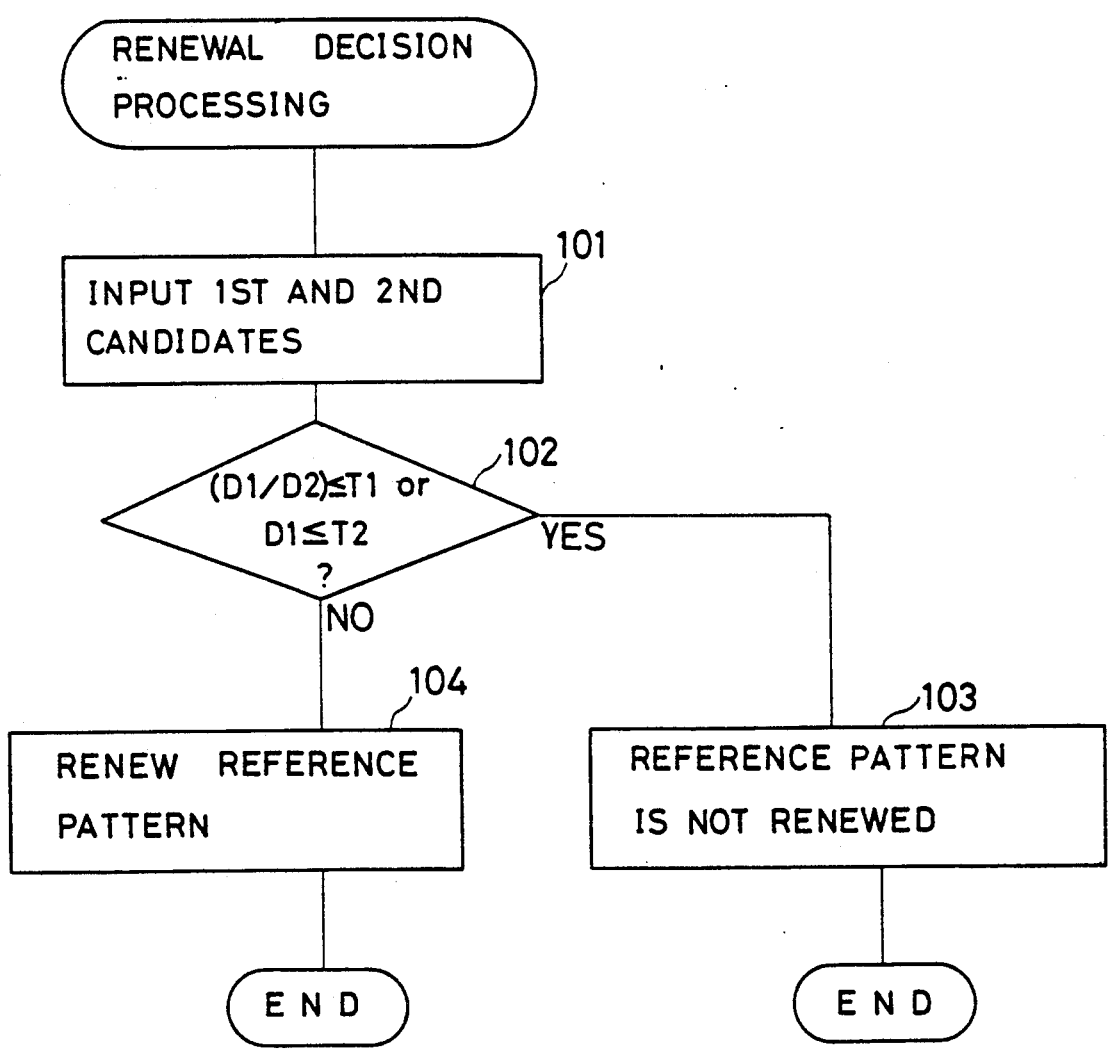
FIG. 2 is a flowchart of a renewal decision procedure which is executed by a renewal decision circuit shown in FIG. 1.

Referring to FIG. 2, the renewal decision circuit 2 determines whether or not the ratio of the highest degree of similarity D1 to the second highest degree of similarity D2 is equal to or less than a predetermined threshold value T1 (step 101). Further, the renewal decision circuit 2 determines whether or not the highest degree of similarity D1 is equal to or less than a predetermined threshold value T2 (step 101). When (D1/D2) $\leq$ T1 or D1 $\leq$ T2, the renewal decision circuit 2 determines that no reference patterns are not to be renewed (step 103).

Adversely when the (D1/D2) > T1 or D1 > T2, the renewal decision circuit 2 executes step 104, in which the reference pattern relating to the candidate having the highest degree of similarity is renewed by the input pattern. This result is supplied to the renewal data operation circuit 3, which renews the reference pattern in the dictionary memory 5 by data of the input pattern stored in the input buffer 4. The threshold values T1 and T2 can be arbitrarily selected on the basis of various parameters of the system.

Figure 3:
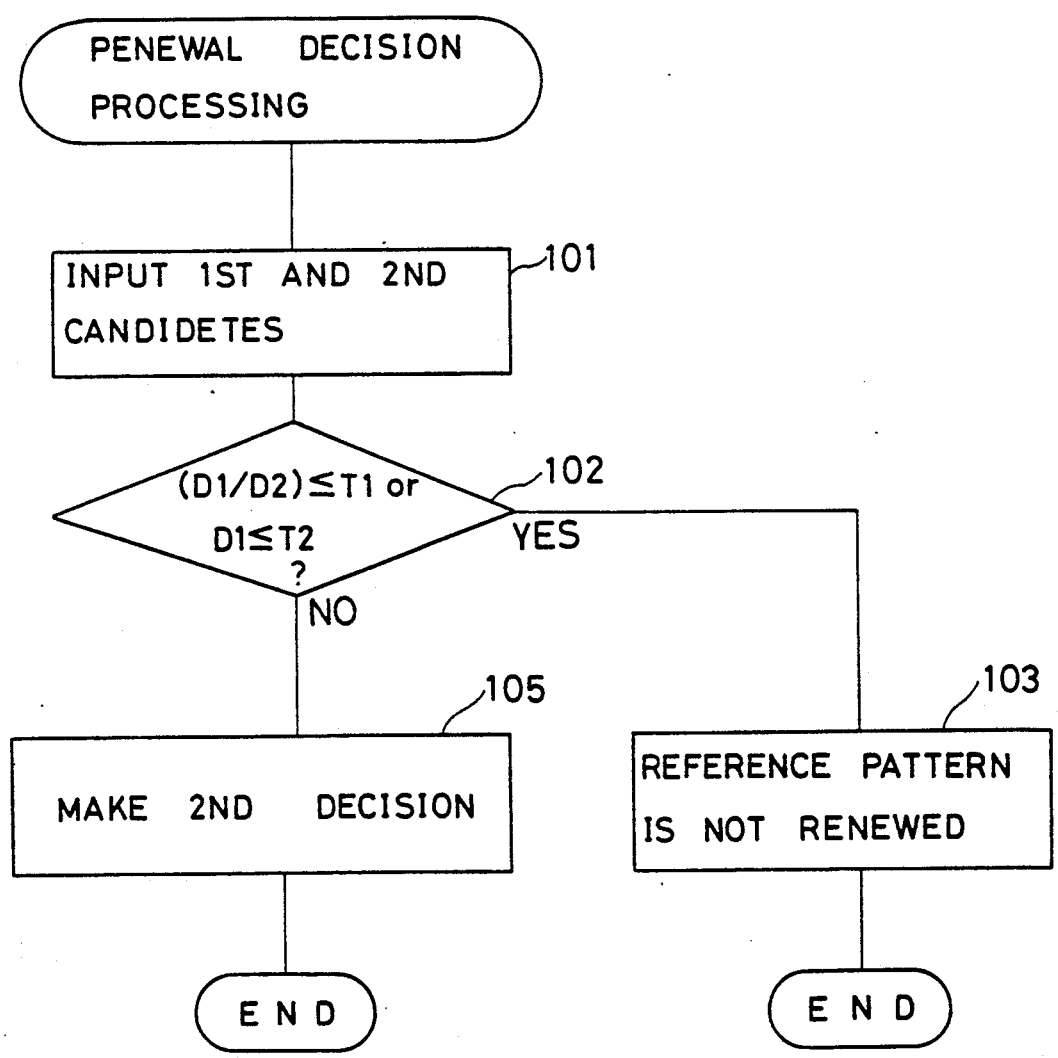
FIG. 3 is a flowchart of an alternative renewal decision procedure which is executed by the renewal decision circuit shown in FIG. 1.
Figure 4A:
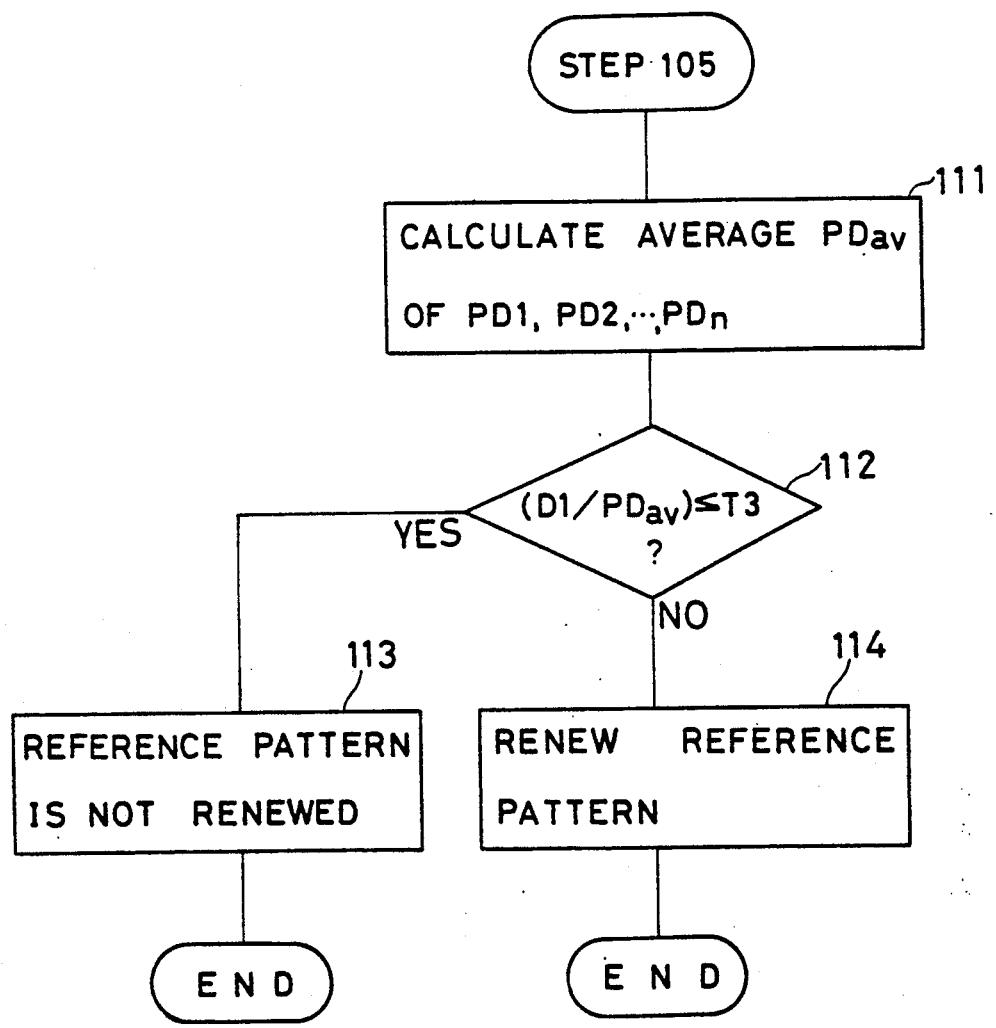
FIGS. 4A through 4D are respectively flowcharts of procedures which are executed at step 105 shown in FIG. 3.

Alternatively, at step 105 shown in FIG. 3, the renewal decision circuit 2 executes a procedure for making a second decision subsequent to the first decision at step 102. An example of the second decision at step 105 is shown in FIG. 4A. At step 111, the renewal decision circuit 2 calculates an average PDav of the past degrees of similarity PD1, PD2, ..., PDn (n is an arbitrary number) which are obtained by the n previous pattern recognition procedures for previous reference patterns for the same word. Then the renewal decision circuit 2 determines, at step 112, whether or not the ratio of the highest degree of similarity D1 to the calculated average PDav is equal to or less than a predetermined threshold value T3. When the result of step 112 is YES, the reference pattern in the dictionary memory 5 is not renewed at step 113. On the other hand, when the result of step 112 is NO, the reference pattern in the dictionary memory 5 is renewed by the renewal data operation circuit 3 at step 114. The threshold value T3 is based on various parameters of the system.

Figure 4B:
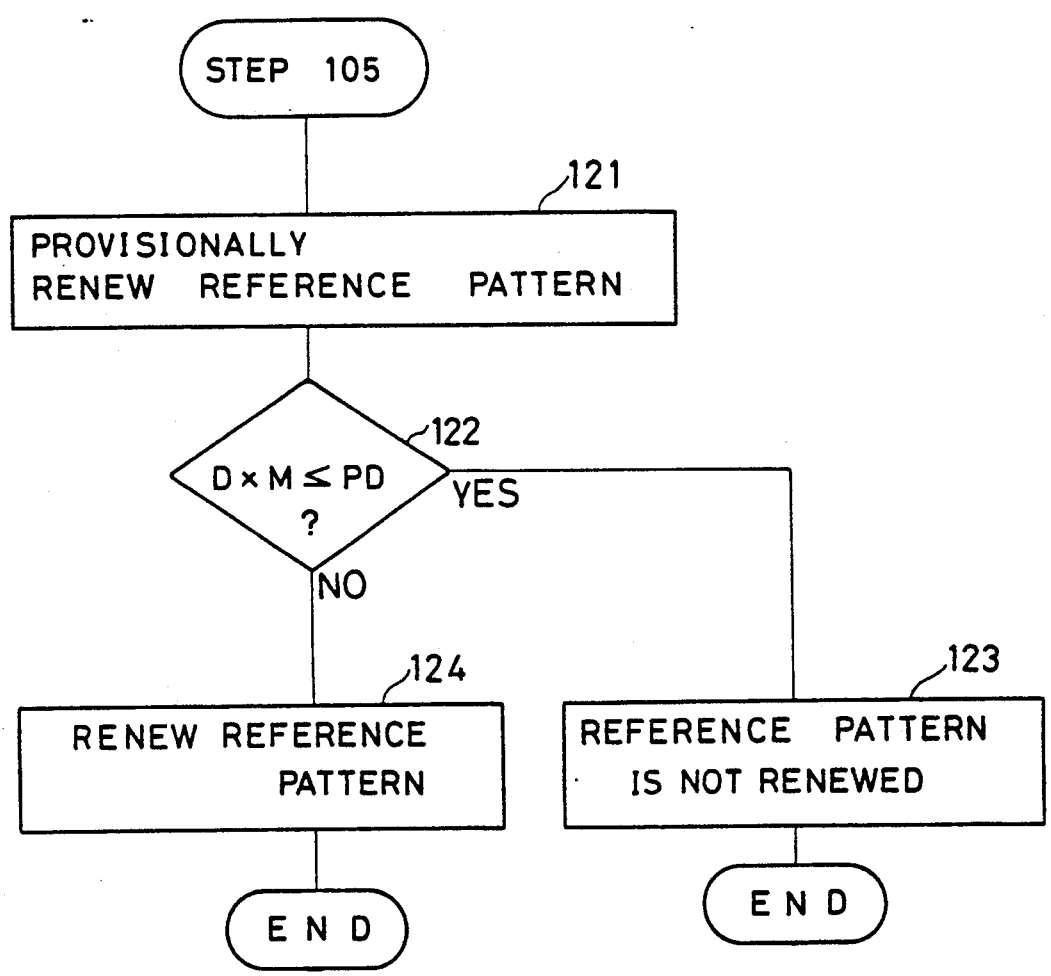

The renewal decision circuit 2 may execute a procedure shown in FIG. 4B instead of the procedure shown in FIG. 4A. At step 121, the renewal data operation circuit 3 creates a renewed reference pattern by using the input pattern (data) stored in the input buffer 4. That is, the provisionally renewed reference pattern is not registered at step 121. At step 122, the renewal decision circuit 2 calculates D $\times$ M where D denotes the degree of similarity of the input pattern in the input buffer 4 to the renewed reference pattern provisionally formed at step 121, and M is a predetermined multiple numeral. Then the renewal decision circuit 2 determines whether or not D $\times$ M $\leq$ PD where PD denotes the degree of similarity obtained by using the current reference pattern which was stored in the dictionary memory 5. When the result of step 122 is affirmative, the reference pattern in the dictionary memory 5 is not renewed. On the other hand, when the result of step 122 is negative, the renewed reference pattern provisionally formed at step 121 is finally registered in the dictionary memory 5 so that the current reference pattern is renewed (step 124). The procedure shown in FIG. 4B is effective to a system such that a conventional linear expansion/compression procedure is employed or a reference pattern is formed by a plurality of utterances. The value of M is based on various parameters of the system.

Figure 4C:
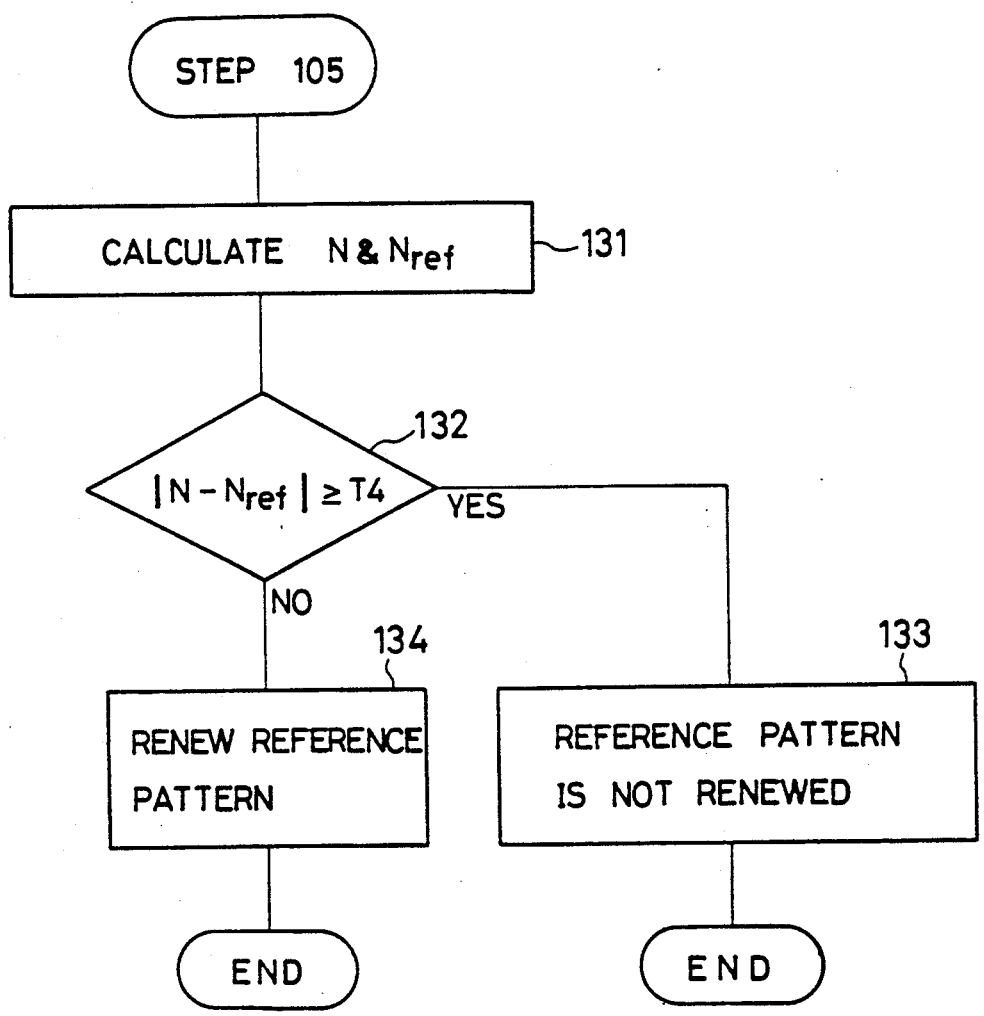

A different procedure which is executed at step 104 (FIG. 3) is illustrated in FIG. 4C. The renewal decision circuit 2 calculates the number N of silent sections of the input pattern, and the number Nref of silent sections of the reference pattern relating to the highest degree of similarity. Then the renewal decision circuit 2 determines whether or not the absolute value of the difference between N and Nref is equal to or greater than a predetermined threshold value T4 (at step 132). When the result of step 132 is YES, the reference pattern in the dictionary memory 5 is not renewed. On the other hand, when the result of step 132 is NO, the current reference pattern in the dictionary memory 5 is renewed by using the input pattern stored in the buffer 4.

Figure 4D:
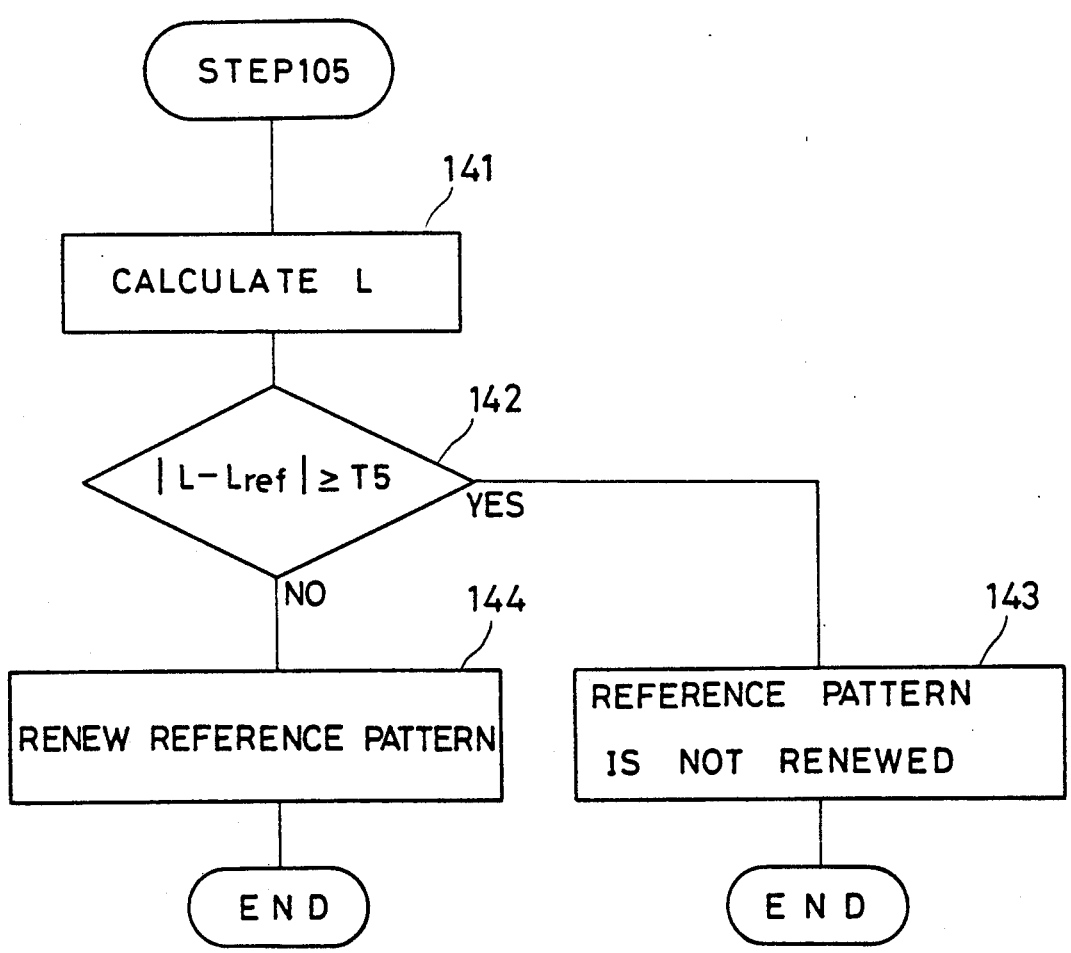

A different procedure which is executed at step 104 (FIG. 3) is further illustrated in FIG. 4D. The renewal decision circuit 2 calculates a length L of the input pattern and a length Lref of the corresponding reference pattern. Then the renewal decision circuit 2 determines whether or not the absolute value of the difference between L and Lref is equal to or greater than a predetermined threshold value (at step 142). When the result of step 142 is YES, the reference pattern in the dictionary memory 5 is not renewed (step 143). On the other hand, when the result of step 142 is NO, the reference pattern is renewed by the input pattern stored in the input buffer 4.

A description is given of a second embodiment of the present invention with reference to FIG. 5, in which those parts which are the same as those shown in the previous figures are given the same reference numerals. The aforementioned first embodiment of the present invention does not take into consideration how frequently each reference pattern stored in the dictionary memory 5 was renewed in the past. From this viewpoint, there is a possibility that a degraded reference pattern is stored by the aforementioned renewing procedure. The second embodiment of the present invention executes a renewal decision processing which refers to the past history of renewal.

The renewal decision circuit 2 according to the second embodiment of the present invention makes a final decision on whether or not each reference pattern of an individual word is to be renewed by referring to an estimate value based on how frequently the reference pattern relating to this word was renewed in the past. The estimate value for each word is stored in an estimate value dictionary 11.

The estimate value indicates how reliable each reference pattern stored in the dictionary memory 5 is, and is represented by the following formula:

$$Xn = X_{n-1} \cdot (1-m) + K \cdot m$$

where n is the number of times that a decision on whether the reference pattern should be renewed is made, m ($0 < m < 1$) is a renewal coefficient, and K is a value, which assumes '1' when it is determined that the reference pattern should be renewed and which assumes '0' when it is determined that the reference pattern should not be renewed. Initially, Xn is set to '0'. It can be seen from the above formula that the estimate value Xn is a function of the number of times that the decision was made in the past as well as the frequency in renewal.

When $m = 0.1$, the estimate value Xn is increased each time renewal is executed. A decision on whether the reference pattern should be renewed is made in accordance with one of the procedures described previously with reference to FIGS. 2, 3 and 4A through 4D. The estimate value Xn for a reference pattern having a high quality is small because the recognition results obtained by this high-quality reference pattern provide high degrees of similarity and are thus not renewed. On the other hand, the recognition results obtained when the speaker has a cold for example, indicates small degrees of similarity to the high-quality reference pattern so that the estimate value Xn increases. For this reason, when the estimate value Xn is high, it is recommended that renewal of the reference pattern should be done. When the reference pattern in the dictionary memory 5 is renewed, the estimate value Xn is decreased. Thus, the reference pattern is changed so that it has a higher quality. When the estimate value Xn is small, nevertheless the degree of similarity of an input pattern to the reference pattern stored in the dictionary memory 5 is small, it is determined that the reference pattern has a high quality and the input pattern has a problem. Thus, the renewal procedure is canceled.

A description is a variation of the second embodiment of the present invention with reference to FIG. 6 in which those parts which are the same as those shown in the previous figures are given the same reference numerals. An estimate value comparator 12 compares the estimate value Xn defined by the aforementioned formula with a reference value equal to 0.5 for example. When $0 < Xn < 0.5$, the estimate value comparator 12 makes a renewal decision circuit 2a active. When $0.5 < Xn < 1$, the estimate value comparator 12 makes a renewal decision circuit 2b active. The estimate value comparator 12 outputs a control signal base on the comparison result and supplies a switch 13 with the same. When the renewal decision circuit 2a is made active, the control signal from the estimate value comparator 12 controls the switch 13 so as to select an output from the renewal decision circuit 2a. When the renewal decision circuit 2b is made active, the control signal from the estimate value comparator 12 controls the switch 13 so as to select an output from the renewal decision circuit 2b. The above-mentioned procedure is executed at step 151.

The renewal decision circuit 2a executes a renewal decision procedure A at step 152, and the renewal decision circuit 2b executes a renewal decision procedure B at step 153. The renewal decision circuit 2a is made active when the dictionary memory 5 (reference pattern) has a high quality. Thus, it is expected that a high degree of similarity to the dictionary memory 5 is obtained. In this case, at step 152, the renewal decision procedure A determines whether the ratio of the highest degree of similarity D1 to the second highest degree of similarity D2 is equal to o less than the aforementioned threshold value T1. When the result is YES, renewal of the reference pattern is not executed. On the other hand, when the result is NO, the reference pattern is renewed by referring to the input pattern stored in the input buffer 4 at step 156.

When the renewal decision procedure B of step 153 is made active, the reference pattern in the dictionary memory 5 was frequently renewed in the past. In this case, the renewal decision procedure B of step 153 determines whether or not the degree of similarity output from the recognition circuit 1 is equal to or less than a predetermined value. When the result of step 153 is affirmative, renewal of the reference pattern is performed at step 156. On the other hand, when the result of step 153 is NO, the reference pattern is not renewed Each of the renewal decision circuits 2a and 2b executes any of the procedures shown in FIGS. 2, 3 and 4A through 4D in which the aforementioned threshold values are individually provided for the renewal decision circuits 2a and 2b.

A description is given of a third embodiment of the present invention with reference to FIG. 8, in which those parts which are the same as those shown in the previous figures are given the same reference numerals. An essential feature of the third embodiment is that the renewal data operation circuit 3 executes procedures shown in FIG. 12 and/or FIG. 13 in addition to the aforementioned procedures. Further, a word/block length calculator 15 is added to the configuration shown in FIG. 1.

FIG. 9 shows the contents of the dictionary memory 5. As is illustrated, the dictionary memory 5 stores word templates (reference patterns) #1, #2, ..., #n for individual words.

Figure 10:
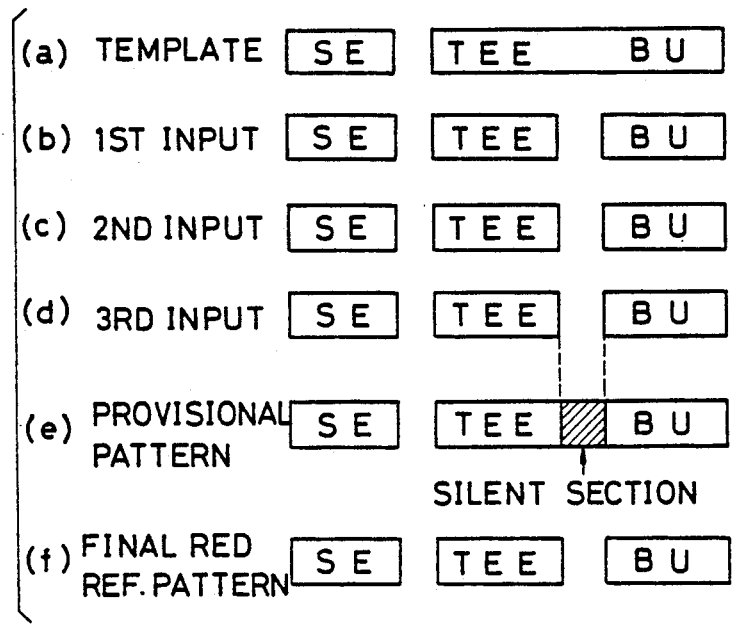
FIG. 10 is a diagram illustrating a procedure of creating a finalized reference pattern to be registered in the dictionary memory shown in FIG. 8.

FIG. 10 shows the operation of the third embodiment. It is now assumed that a reference pattern (word template) having two blocks shown in (a) of FIG. 10 has been registered in the dictionary memory. It is further assumed that the reference pattern shown in (a) of FIG. 10 is created by three input patterns. In this case, it is said that the reference pattern has a weighting factor W of 3.

As shown in FIG. 11, the reference pattern (word template) is created by three input patterns INP1, INP2 and INP3 in accordance with a conventional binary time-spectrum pattern method, for example (see J. Fujimoto et al, "A SPOKEN WORD RECOGNITION METHOD BY BINARY TSP MATCHING", Ricoh Technical Report No. 11, May 1984, pp. 4–12). In the illustrated example, the length of each of the three input patterns INP1, INP2 and INP3 is different from each other. In this case, the reference pattern has a length equal to the greatest length of the input patterns. In the illustrated example, the input pattern INP1 has the greatest word length. Thus, an appropriate number of frames is added to each of the second and third input patterns INP2 and INP3.

Figure 12:
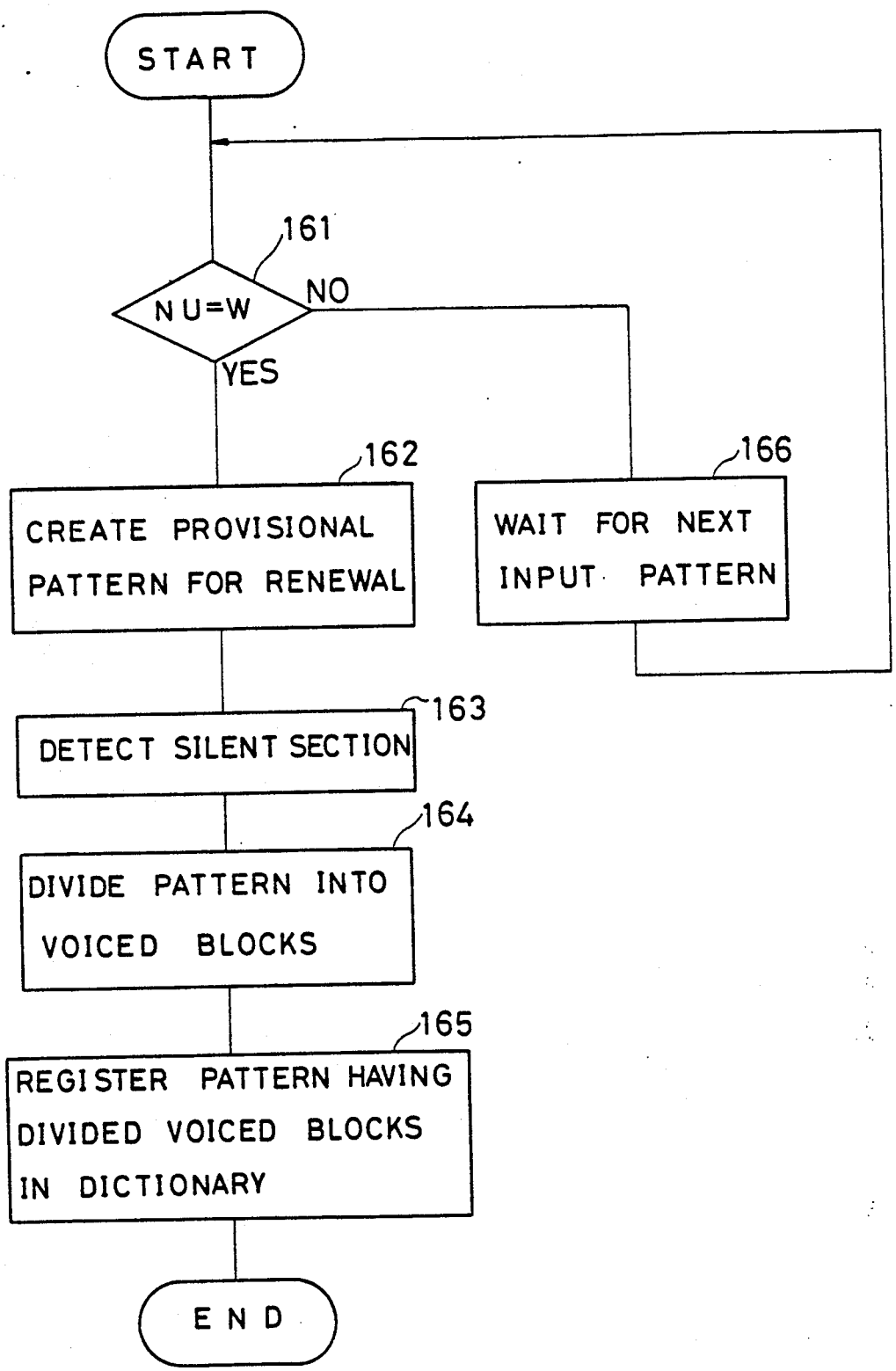
FIG. 12 is a flowchart of a procedure executed by a renewal data operation circuit shown in FIG. 8.

When a first input pattern for renewal is input to the system and the renewal decision circuit 2 determines that the reference pattern shown in (a) of FIG. 10 should be renewed in accordance with any of the aforementioned procedures shown in FIGS. 2, 3 and 4A through 4D, the renewal data operation circuit 3 starts a procedure shown in FIG. 12. At step 161, the renewal data operation circuit 3 determines whether or not the number of times NU that the reference pattern relating to a word of concern was renewed in the past is equal to the aforementioned weighting factor W of the reference pattern. When the result of step 161 is NO, the renewal data operation circuit 3 waits for the next input pattern. When the result of step 161 is YES, the renewal data operation circuit 3 creates a provisional reference pattern by NU (=W) input patterns (step 162). As described previously, the reference pattern shown in (a) of FIG. 10 has the weighting factor W equal to 3. Thus, when three input patterns shown in (b), (c) and (d) of FIG. 10 are input, a provisional reference pattern shown in (e) of FIG. 10 is created from the three input patterns. It is noted the number of blocks of the provisional reference pattern is determined to be equal to the reference pattern (template) shown in (a) of FIG. 10. Thus, the provisional reference pattern shown in (e) of FIG. 10 has two blocks.

Thereafter, the renewal data operation circuit 3 detects a silent section in each voiced section (block) of the provisional pattern (step 163). The provisional reference pattern shown in (e) of FIG. 10 has a silent section in the second block. At step 164, the renewal data operation circuit 3 divides the second block of the provisional reference pattern into blocks by the detected silent section (two blocks in the illustrated case) so that a finalized reference pattern to be substituted for the reference pattern shown in (a) of FIG. 10 is generated as shown in (f) of FIG. 10. Then the renewal data operation circuit 3 registers the reference pattern shown in (f) of FIG. 10 in the dictionary memory 5 (step 165).

Figure 14:
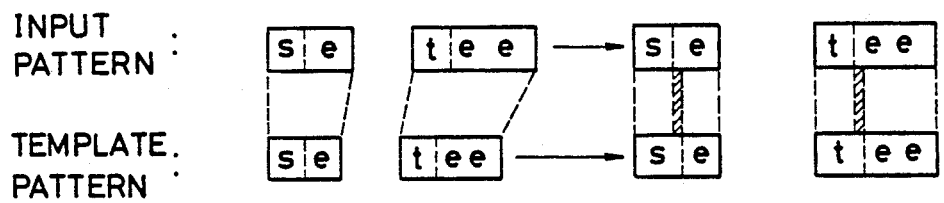
FIGS. 14 and 15 are diagrams illustrating how to create a finalized reference pattern to be registered in the dictionary memory in accordance with the procedure shown in FIG. 13.
Figure 15:
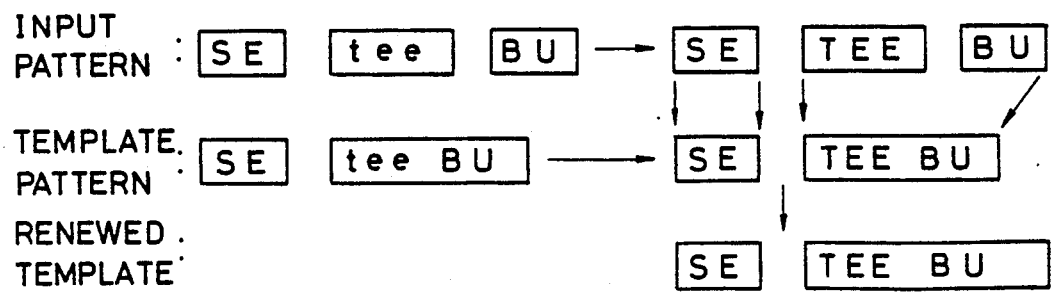
Figure 13:
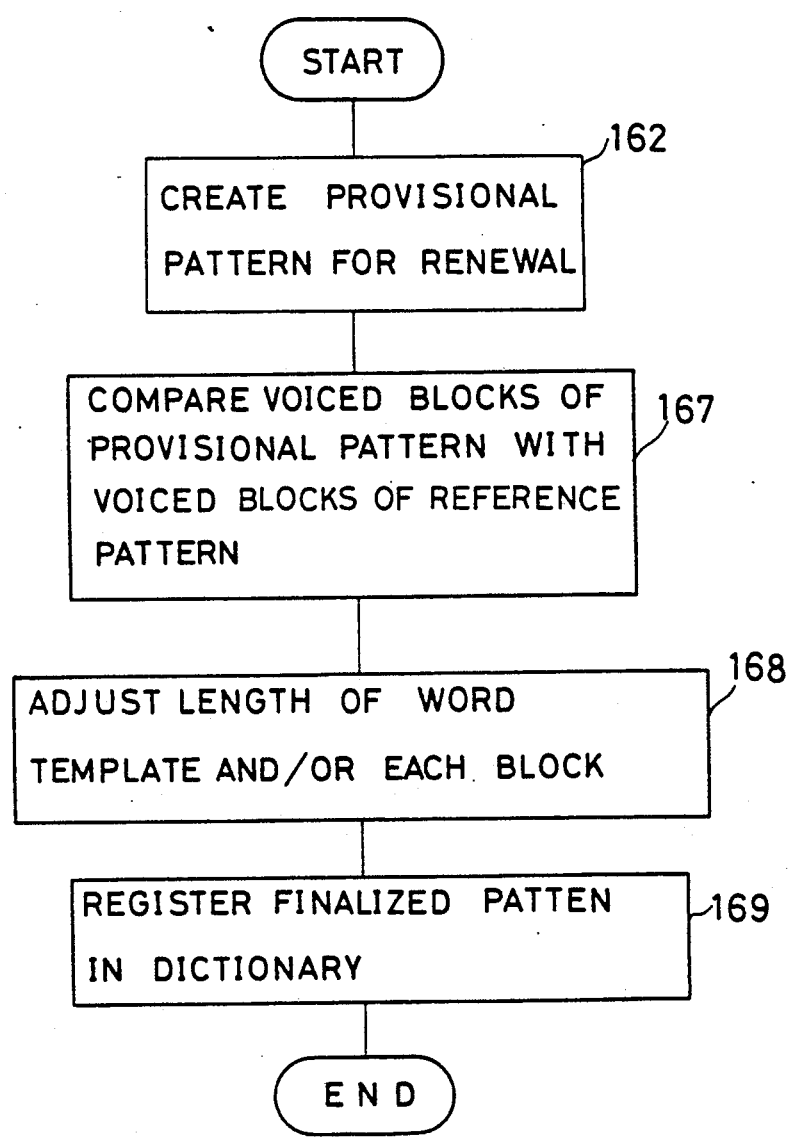
FIG. 13 is a flowchart of an alternative procedure executed by the renewal data operation circuit shown in FIG. 8.

Alternatively, the renewal data operation circuit 3 executes a procedure shown in FIG. 13. At step 162, the renewal data operation circuit creates a provisional reference pattern from an input pattern stored in the buffer circuit 4. It is noted that in this case, a single input pattern is used for creating a renewal reference pattern. After executing step 162, the renewal data operation circuit 3 executes step 167, which compares voiced blocks of the provisional reference patter with voiced blocks of a corresponding reference pattern (word template). At step 167, the word and lengths of the input pattern and the provisional pattern calculated by the word/block length calculator 15 are referred to. At step 168 subsequent to step 167, the renewal data operation circuit 3 adjusts the length of the provisional reference pattern and/or the length of each block thereof as shown in FIGS. 14 and 15. In this adjustment, the following formula is used:

$$R = D(W-1) + X$$

where W is the aforementioned weighting factor of the reference pattern (word template) of concern, D is the length of the reference pattern or each voiced frame thereof, X is the length of an input pattern or the length of each voiced block thereof, and R is the length of the finalized reference pattern to be registered in the dictionary memory 5 or the length of each voiced block thereof. As a result, the length of the reference pattern approaches the actual length of the word.

The present invention is not limited to the aforementioned description, and variations and modifications may be made without departing from the scope of the present invention.

What is claimed is:
1. A reference pattern renewing method comprising:
    (a) inputting an input pattern of an utterance of a word;
    (b) comparing said input pattern with reference patterns stored in a dictionary memory to thereby generate at least a first candidate having the highest degree of similarity and a second candidate having the second highest degree of similarity;
    (c) calculating a ratio of the highest degree of similarity to the second highest degree of similarity;
    (d) determining whether or not said ratio is equal to or less than a predetermined threshold value;
    (e) calculating, from said input pattern, a renewed reference pattern to be substituted for a corresponding one of said reference patterns when it is determined that the ratio of the highest degree of similarity to the second highest degree of similarity is neither equal to nor less than said predetermined threshold value; and
    (f) registering said renewed reference pattern in said dictionary memory instead of said corresponding one of said reference patterns.

2. A reference pattern renewing method as claimed in claim 1, further comprising a step of
    determining whether the second degree of similarity is equal to or less than a second threshold value,
    wherein said step for calculating said renewed reference pattern calculates said renewed reference pattern when it is determined that the second highest degree of similarity is neither equal to nor less than the second threshold value.

3. A reference pattern renewing method as claimed in claim 1, further comprising the steps of:
    inputting a plurality of input patterns;
    determining whether a number of times that the corresponding one of said reference patterns is renewed in the past is equal to or less than a number of patterns used for creating said corresponding one of said reference patterns;
    creating a provisional reference pattern from said input patterns when it is determined that the number of times that the corresponding one of said reference patterns is renewed in the past is equal to the number of patterns used for the corresponding one of said reference patterns, said provisional reference pattern having a voiced section;
    detecting a silent section in said voiced section of said provisional reference pattern; and
    dividing said provisional reference pattern into blocks by said silent section to thereby generate a finalized reference pattern,
    wherein said step for registering said renewed reference pattern registers, as said renewed reference pattern, said finalized reference pattern in said dictionary memory.

4. A reference pattern renewing method as claimed in claim 1, further comprising the steps of:
creating a provisional reference pattern from said input pattern;
calculating a length R of a renewed reference pattern created from said provisional reference pattern by using the following formula, $$R = D(W-1) + X$$

where W is a number of said patterns used for creating the corresponding one of said reference patterns, D is a length of the corresponding one of said reference patterns, and X is a length of said input pattern; and
generating said renewed reference pattern having said length R to be registered in said dictionary memory from said provisional reference pattern.

5. A reference pattern renewing method as claimed in claim 1, further comprising the steps of:
creating a provisional reference pattern from said input pattern;
calculating a length R of a voiced section of a renewed reference pattern created from said provisional reference pattern by using the following formula, $$R = D(W-1) + X$$

where W is the number of said patterns used for creating the corresponding one of said reference patterns, D is a length of a corresponding voiced section of the corresponding one of said reference pattern, and X is a length of a corresponding voiced section of said input pattern; and
generating said renewed reference pattern having said voiced section having said length R to be registered in said dictionary memory.

6. A reference pattern renewing method as claimed in claim 1, further comprising the steps of:
calculating an estimate value Xn indicating hour reliable of the corresponding one of said reference patterns in accordance with the following formula, $$X_n = X_{n-1} \cdot (1-m) + K \cdot m$$

where n is the number of times that a decision on whether the reference pattern should be renewed on the basis of said step (d) is made, $X_{n-1}$ is a previous estimate value, m (0 < m < 1) is a renewal coefficient, and K is a value which assumes '0' when it is determined that the one of said reference patterns should be renewed and which assumes '0' when it is determined that one of said the reference patterns should not be renewed; and
comparing said estimate value X with a predetermined reference value; and
determining whether or not said renewed reference pattern should be registered in said dictionary memory on the basis of said estimate value.

7. A reference pattern renewing method as claimed in claim 6, wherein said predetermined threshold value is changed in accordance with said estimate value.

8. A reference pattern renewing method comprising:
(a) inputting an input pattern of an utterance of a word;
(b) comparing said input pattern with reference patterns stored in a dictionary memory to thereby generate at least a first candidate having the highest degree of similarity and a second candidate having the second highest degree of similarity;
(c) calculating a ratio of the highest degree of similarity to the second highest degree of similarity;
(d) determining whether or not said ratio is equal to or less than a predetermined threshold value;
(e) making a predetermined additional decision on whether or not one of said reference patterns relating to the highest degree of similarity is to be renewed when said step (d) determines that said ratio is equal to or less than said predetermined threshold ratio;
(f) calculating, from said input pattern, a renewed reference pattern to be substituted for said one of said reference patterns when said step (f) determines that said one of reference patterns should be renewed; and
(g) registering said renewal reference pattern in said dictionary memory instead of said one of said reference patterns.

9. A reference pattern renewing method as claimed in claim 8, further comprising the steps of:
calculating an average of a predetermined number of past degrees of similarity obtained in the past by said step (b); and
determining whether a ratio of the highest degree of similarity to said average is equal to or less than a second predetermined threshold value,
wherein when the ratio of the highest degree of similarity to said average is neither equal to nor less than said second predetermined threshold value, said step (f) calculates said renewed reference pattern to be substituted for said one of said reference patterns from said input pattern.

10. A reference pattern renewing method as claimed in claim 8, further comprising the step of:
comparing said input pattern with said renewed reference pattern to thereby generate a degree of similarity;
multiplying said degree of similarity to said renewed reference pattern by a predetermined constant to generate a multiplied degree of similarity to said renewed reference pattern; and
determining whether said multiplied degree of similarity relating to said renewed reference pattern is equal to or less than a second predetermined threshold value;
wherein when said multiplied degree of similarity to said renewed reference pattern is neither equal to nor less than said second predetermined threshold value, said step (f) calculates said renewed reference pattern to be substituted for said one of said reference patterns from said input pattern.

11. A reference pattern renewing method as claimed in claim 8, further comprising the steps of:
calculating a number of voiced patterns included in said one of the reference patterns;
calculating a number of voiced patterns included in said input pattern;
calculating an absolute value of a difference between said number of voiced patterns in said one of the reference patterns and said number of voiced patterns included in said input pattern; and determining whether said absolute value is equal to or greater than a second predetermined threshold value, wherein when said absolute value is neither equal to nor greater than said second predetermined threshold value, said step (f) calculates said renewed reference pattern to be substituted for said one of said reference patterns from said input pattern.

12. A reference pattern renewing method as claimed in claim 8, comprising the steps of:

calculating a length of the one of said reference patterns;

calculating a length of said input pattern;

calculating an absolute value of a difference between said length of the one of said reference patterns and said length of said input pattern; and determining whether said absolute value is equal to or greater than a second predetermined threshold value, wherein when said absolute value is neither equal to nor greater than said second predetermined threshold value, said step (f) calculates said renewed reference pattern to be substituted for said one of said reference patterns from said input pattern.

13. A reference pattern renewing method as claimed in claim 8, further comprising a step of determining whether the second degree of similarity is equal to or less than a second threshold value, wherein said step for calculating said renewed reference pattern calculates said renewed reference pattern when it is determined that the second highest degree of similarity is neither equal to nor less than the second threshold value.

* * * * *